June 11, 1968   W. A. MARTIN   3,387,755
SPROCKET SOUND REPRODUCTION APPARATUS AND METHOD
Filed March 19, 1965
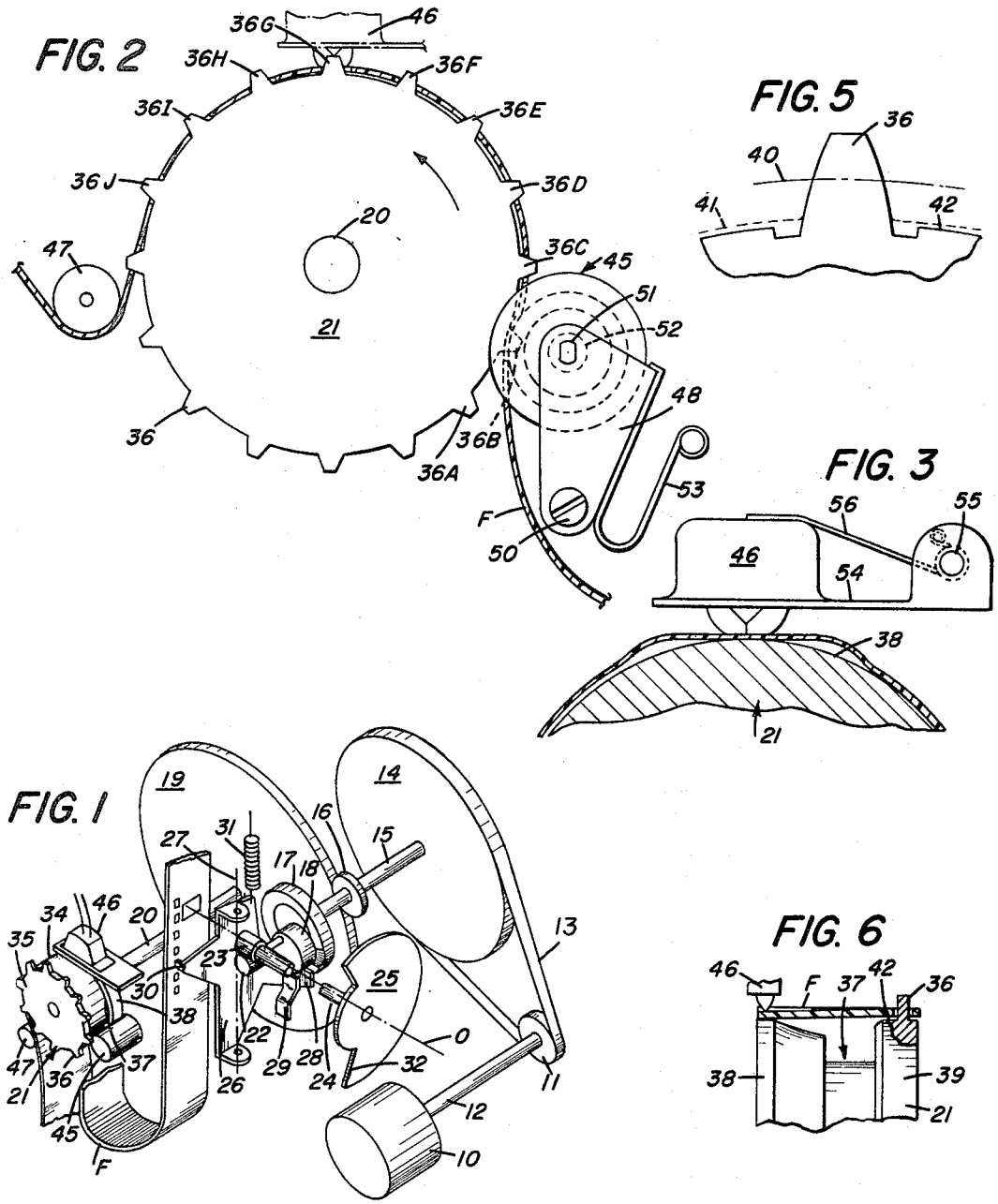
WILLIAM A. MARTIN
INVENTOR.
BY R. Frank Smith
Lloyd F. Seebach
ATTORNEY & AGENT 3,387,755
SPROCKET SOUND REPRODUCTION
APPARATUS AND METHOD
William A. Martin, Rochester, N.Y., assignor to Eastman
Kodak Company, Rochester, N.Y., a corporation of
New Jersey
Filed Mar. 19, 1965, Ser. No. 441,011
13 Claims. (Cl. 226—6)

ABSTRACT OF THE DISCLOSURE

A film strip is advanced toward a sound transducer head by rotation of a sprocket and a roller. The transducer is spring biased toward the sprocket and into engagement with a sound reproducing track on the film strip. The force exerted on the strip by the head opposes movement of the strip past the head, thereby causing the strip to become bowed with respect to the sprocket surface just before the strip is engaged by the transducer head.

---

The present invention relates to photographic apparatus and more particularly to an apparatus and method for advancing a film strip having a sound reproducing track in which a sound transducer head is arranged in sound transducing relationship to the film strip wrapped about at least a portion of a sprocket that is positioned relatively close to a film gate.

In order to obtain an apparatus and method that is capable of good quality sound reproduction, it is conventional practice, after a film strip having a sound reproducing track has been positioned in a film gate, to first form a loop of film and then thread the film strip around a sound drum and around a sprocket, a sound transducer head, or record/play head, being mounted adjacent the drum and in contact with the sound track for sound reproduction. Such an apparatus and method requires that the sound drum and record/play head be positioned at a distance from the film gate that is equivalent to substantially 56 image frames in the case of 8 mm. film. This relatively long image-to-sound separation was established as a standard separation at an early date to provide sufficient space in which the sound drum and sprocket mechanisms could be arranged.

Inasmuch as the perforations in a film strip may vary in pitch, that is, center-to-center distance, due to the manner in which the film strip was perforated and/or the inherent shrinkage of the film strip due to age, humidity conditions, etc., such pitch variation causes erratic movement of the film strip by the sprocket, thereby producing a sound reproduction of poor quality. It has been attempted to improve the quality of the sound reproduction by such an apparatus by means of a flywheel system coupled to the sound drum and a suitable damping system, thereby increasing the complexity of the apparatus.

With an apparatus such as that just described, automatic threading of the film strip in a camera or projector becomes quite complex in that an additional threading path must be provided, namely, from the sound drum to the sprocket. Further, during the threading operation, the sound drum must be engaged by a drive means in order to feed the film strip around the drum and to bring the flywheel up to speed and then disengage it from the drive means during normal operation. Also, editing of a film strip presents a problem because of the large image-to-sound separation.

For most 8 mm. magnetic sound projectors, the standard spacing of the record/play head from the film gate or, more specifically, from the image frame being projected, is 56 frames of film which represent approximately 2⅔ seconds of running time. When editing a processed film strip, it is necessary to transfer the sound from the film strip onto another medium, or tape, by using a projector and camera, or a projector and some other magnetic recording device. The filmstrip and tape can then be put in "editorial sync" (zero spacing) in a film editor that will maintain this relationship during the editing process. After editing, the tape and film strip are put in "projector sync" (56 frames of seperation) by transferring the sound record back onto the film strip. With this process of transferring the sound record from one medium to another, there can be a loss of part of the sound record as well as a loss of sound quality.

The primary object of the invention is, therefore, to provide an improved apparatus and method for reproducing sound on a film strip that has highly improved quality.

Another object of the invention is to provide an improved apparatus and method for reproducing sound on a film strip which permits the image-to-sound separation to be greatly reduced.

A still further object of the invention is to provide an improved apparatus and method for reproducing sound on a film strip in which slip-back or jumping of the film strip caused by the teeth engaging the film perforations beyond the record/play head is not introduced because these teeth, while extending into their respective film perforations, do not serve to move or advance the film strip.

And yet another object of the invention is to provide an apparatus and method for reproducing sound on a film strip that is simple in structure and facilitates film editing.

These and other objects and advantages will be readily apparent to those skilled in the art by the description which follows of a preferred embodiment of the invention.

The above-mentioned objects have been attained by the present invention which provides an apparatus and method for sound reproduction in which the sound drum, flywheel system and accompanying damping system are eliminated and the sound reproduction takes place at the sprocket while the film strip is being moved continuously thereby. Such an apparatus and method is applicable to double 8 mm. film, single perforation 16 mm. film or any other film size wherein a sound record track is arranged along one longitudinal edge of the film and the perforations are spaced along the other longitudinal edge. Further, the apparatus and method can be used for sound recording, as in a camera, or for the sound reproduction, as in a projector. The term "sound reproducing," as used herein, is therefore meant to include both sound recording (record) or sound reproduction (play).

According to the invention, a sprocket is arranged beyond the film gate in the direction of film movement such that the image-to-sound separation is within 18 frames. The film strip is threaded between the sprocket and a canted pressure roller, around a portion of the sprocket and under a record/play head and finally passes around a snubbing or stripping roller into an outlet path to a take-up reel. A drive mechanism provides a uniform velocity drive to the sprocket. The sprocket is provided with a first peripheral surface adjacent the teeth having a diameter that is less than that of the root diameter of the sprocket teeth. At the end of the sprocket hub, which is opposite the sprocket teeth and disposed under the record/play head, a second peripheral surface is provided that is the same diameter as the first peripheral surface, the intermediate portion being undercut to a diameter less than the peripheral surfaces so as not to engage the image areas on the film strip. The pressure roller holds the film strip against both of the peripheral surfaces and the head holds the film strip against only the second peripheral surface. Since the peripheral surfaces are smaller in diameter than the root diameter of the sprocket teeth, the linear distance between the lines of engagement of the film strip at the pressure roller and at the head is less than it would be if measured along the root diameter. Accordingly, when a strip of film is partially wrapped around the sprocket, each perforation engages a respective sprocket tooth between the pressure roller and the head. The film strip cannot engage the peripheral surfaces because the force applied to the film strip by the head effects a shorter linear distance between the pressure roller and the head than the length of the film strip as determined by the sprocket teeth. In addition the inherent rigidity, or stiffness, of the film strip does not allow it to bottom. As a result, the film strip assumes a generally arcuate path between the pressure roller and the head that is substantially the same as the root diameter of the sprocket teeth. Since the force that is applied to the film strip by the head to hold the film strip against the second peripheral surface is continuous and opposes movement thereof, each film perforation takes such a relation to its respective sprocket tooth that the leading edge of the perforation is always engaged by the tooth.

With an apparatus and method such as that just described, it has been found that an unexpected improvement in sound quality is obtained. In addition, such an apparatus and method lends itself to a simplified automatic threading structure as well as elimination of the complex arrangement of a sound drum, flywheel and damping system. Further, since the image-to-sound separation is within 18 frames, editing can be done on the original film, the "editorial sync" and "projector sync" being nearly the same because the spacing is of such short time duration (⅔ second) that any splice that is made in the film strip is, for all practical purposes, unnoticeable when projected.

Reference is now made to the accompanying drawing wherein like reference numerals and characters designate like parts and wherein:

FIG. 1 is a diagrammatic perspective view of the principal elements of a motion picture camera showing the relation of the sprocket and sound transducer head to the image area in the exposure station;

FIG. 2 is an enlarged detail end view of a film sprocket, pressure roller and snubbing roller and showing the relationship of the film strip to the teeth and the base diameter of the sprocket on each side of a record/play head;

FIG. 3 is an enlarged detail sectional view through the sprocket showing the record/play head in its sound transducing position for applying a force to the film strip thereunder;

FIG. 4 is a plan view of the sprocket and rollers shown in FIG. 2;

FIG. 5 is a detail view of a sprocket tooth showing the relationship between the root diameter of the tooth and the diameters of the film engaging peripheral surfaces of the sprocket; and FIG. 6 is an enlarged detail sectional view taken through the sprocket ahead of the record/play head showing the relationship of the film strip to the spaced peripheral surfaces of the sprocket due to the force applied by said head to the film strip.

Reference is now made to FIG. 1 of the drawing wherein the essential elements of a motion picture camera are disclosed. It is to be understood that while the invention is disclosed and described with respect to a camera, the same principle and structure is applicable to a motion picture projector. A motor 10, which can be an electric, battery or spring motor, provides the prime moving force for the camera mechanism. The motor 10 has a pulley 11 fixed to its shaft 12 and the pulley 11 is encircled by a belt 13 for imparting rotation to a pulley 14 fixed to a shaft 15. The shaft 15 also carries a gear 16, a face cam 17 and an eccentric 18. The gear 16 meshes with a gear 19 on a shaft 20 which has a sprocket 21 fixed thereto. The shaft 15 also carries a worm gear 22 which meshes with a worm 23 on a shaft 24 to which a conventional shutter element 25 is secured in a well known manner.

A film strip F is guided from a supply reel or spool to a film gate in a conventional manner and is advanced intermittently at the film gate by a claw member 26. The claw member is pivotally mounted for movement about an axis designated by the numeral 27 and is pivoted thereabout by means of the face cam 17 which engages a follower arm 28 which is an integral part of member 26, the follower arm being biased against the face cam 17 by a compression or leaf spring 29. The member 26 is provided with a claw 30 which engages successive perforations in the one edge of the film strip F for advancing the film strip intermittently through the film gate. The vertical movement of member 26 along axis 27 is accomplished by the eccentric 18 and a tension spring 31, the eccentric engaging an edge of the follower arm 28 for moving the member 26 in a downward direction against the action of spring 31 which, in turn, moves the member 26 in an upward direction and holds it against the eccentric. This mechanism is so designed that the opening 32 in shutter 25 moves past the optical axis O of the camera at the time the claw member 26 is disengaged from the film strip. From the mechanism described thus far, it should be evident that the sprocket 21 is rotated continuously, the film strip is advanced intermittently and the claw member 26 oscillates in a vertical and horizontal direction to provide the necessary intermittent motion.

The sprocket 21 comprises a hub 34 and a plate 35 that is fixed to the hub and provided with radially extending teeth 36 are equiangularly spaced about the plate, as shown in FIG. 1. As is customary in the photographic field, the film strip F is engaged only along each longitudinal edge portion by any member in contact therewith in order to eliminate the possibilities of scratching the image areas. Accordingly, the hub 34 is provided with an undercut portion 37 and a peripheral surface 38 against portions of which the unperforated edge of the film strip is held when it is at least partially wrapped around the sprocket. Although the plate 35 has been described thus far as being a separate plate, it can be made integral with the hub 34, as shown in FIG. 6, with teeth 36 formed on an end portion 39 of the hub. With reference to FIGS. 5 and 6, each sprocket tooth 36 is normally generated with respect to a pitch circle 40 and has a root diameter 41 against which a film strip is normally held in conventional practice. However, in the present invention a peripheral surface 42 is provided adjacent the sprocket teeth which is substantially the same in diameter as peripheral surface 38, the surfaces 38 and 42 being smaller in diameter than the root diameter of the sprocket teeth. The purpose of these smaller diameters will become evident from the description which follows.

After the film strip F has been threaded through the film gate in a normal manner, it is partially wrapped around the sprocket 21, the film being positioned under a pressure roller 45, a record/play head 46 and partially around a snubbing roller 47, see FIGS. 1 and 2. The pressure roller 45 is mounted between a pair of plates 48 and 49 each of which is individually mounted for pivotal movement about a stud 50. The plates 48 and 49 have apertures 51 for receiving the ends of a post 52 on which the roller 45 is mounted, the apertures being offset so the roller is canted with respect to the axis of sprocket 21. The roller 45 is held against the sprocket 21 by a spring 53 and serves to hold the film strip F against both the peripheral surface 38 and the peripheral surface 42 of the sprocket. The record/play head 46 is carried by an arm 54 that is pivotally mounted on a stud 55 and urged by a spring 56 against the film strip F to hold the latter against the peripheral surface 38. The spring 56 therefore exerts a force against the record/play head 46, which in turn, bears against the film strip to oppose movement of the film strip past the head at the longitudinal edge of the film strip opposite the perforated edge. The snubbing roller 47 is positioned generally opposite the pressure roller 45 and is spaced from the sprocket 21 so that the film strip is wrapped around at least 135° of the sprocket. The roller 47 guides the film strip into an outgoing path from the sprocket to a take-up reel in a well known manner.

While the pressure roller 45 holds the film strip F against both the peripheral surface 38 and the peripheral surface 42 of the sprocket, the force that is applied to the film strip in the immediate vicinity of the record/play head 46 by means of the spring 56 is exerted only against the one edge of the film strip. This force opposes movement of the film strip and causes it to rise away from the peripheral surface 38 immediately in front of and behind the head 46 as seen in FIG. 3. The film strip then assumes a path relative to sprocket teeth 36C, 36D, 36E and 36F, as seen in FIG. 2, that corresponds generally to the normal position it would assume under conventional practice. Due to the fact that the film strip is continuously held against surfaces 38 and 42 at separated lines of engagement by roller 45 and head 46, the linear difference between the length of the film strip in this region and the length measured along the peripheral surface 38 is such that the film strip cannot engage either of the peripheral surfaces 38 or 42 because of the relation of each perforation to its respective sprocket tooth and the inherent rigidity of the film strip. This can be best exemplified by the position assumed by a thin, resilient member that is positioned between two fixed members that are separated by a distance somewhat less than the length of the member. In this case the member will assume a slightly bowed position, the amount of bow being dependent on the difference in length between the member and the fixed members.

This perforation-tooth relationship is shown in FIG. 2 wherein tooth 36A is about to enter a film perforation whereas at tooth 36B the film strip is pressed against the peripheral surface 38 and the peripheral surface 42 by roller 45. Teeth 36C, 36D, 36E and 36F engage the leading edges of the perforations to advance or push the film strip toward the record/play head 46 and against the opposition of the applied force. The tooth 36G which is aligned with the record/play head 46 also engages the leading edge of its respective film perforation but tooth 36H is outside of any effect of the applied force so that the film strip tends to slide down the tooth face, thereby preventing the film at tooth 36G from moving too high on this tooth. At tooth 36I the film perforation is entirely free of the tooth and left completely free at tooth 36J.

Since the film strip F is held against the peripheral surfaces 38 and 42 by the pressure roller 45 and only against the peripheral surface 38 by the record/play head 46, the film strip assumes a substantially arcuate path that corresponds generally to that of the root diameter of the sprocket teeth. This takes place because the film strip cannot bottom due to the difference in linear distance between the roller 45 and the head 46 as measured along the peripheral surfaces 38 and 42 and the length of the film strip as determined by the perforations between roller 45 and head 46 so that in this region only the sprocket teeth between the pressure roller and the record/play head serve to advance the film strip. As disclosed above, this structure eliminates any erratic movement of the film strip due to shrinkage, age etc. It has been found that if the peripheral surfaces 38 and 42 are not smaller in diameter than the root diameter of the sprocket teeth, a very poor quality sound reproduction is obtained. On the other hand, if the sprocket is provided with peripheral surfaces that are smaller in diameter than the root diameter and the film strip is in effect suspended between the pressure roller and the head and engaged only by the sprocket teeth as described above, a high quality sound reproduction can be obtained.

The invention has been described in detail with particular reference to a preferred embodiment thereof but it will be understood that variations and modifications can be affected within the spirit and scope of the invention as described hereinabove and as defined in the appended claims.

The embodiments of the invention in which an exclusive property or privilege is claimed are defined as follows:

1. An apparatus for advancing an elongate web having spaced perforations adjacent one longitudinal edge and a sound reproducing track adjacent the other edge, comprising in combination:
   a continuously rotatable member about which said web is adapted to be at least partially wrapped for driving engagement therewith, said member having a plurality of circumferentially spaced teeth extending from one of a pair of spaced peripheral surfaces for entering respective perforations in said web:
      said pair of peripheral surfaces being substantially equal in diameter and smaller in diameter than the root diameter of said teeth;
      first means arranged adjacent said rotatable member for urging and holding said web in engagement with said pair of surfaces as said web is moved therepast;
   second means arranged generally opposite said first means and adjacent to said rotatable member for engaging and guiding said web into an outgoing path; and transducer means arranged intermediate said first and second means and in sound-transducing relationship with said sound track, said transducer means holding said web against the other of said pair of surfaces and exerting a force on said web opposing the movement thereof such that said web assumes a position in which it is free of said pair of peripheral surfaces, at least between said first means and said transducer means, so that only said teeth between said first means and said transducer means engage the leading edges of their respective perforations for advancing said web.

2. An apparatus in accordance with claim 1 wherein said first means comprises a biased canted roller.

3. An apparatus in accordance with claim 1 wherein said second means comprises a snubbing member.

4. An apparatus in accordance with claim 1 wherein said web is wrapped around at least 135° of said rotatable member.

5. An apparatus in accordance with claim 1 wherein the position assumed by said web between said first means and said transducing means generally conforms to the root diameter of said teeth.

6. An apparatus in accordance with claim 1 wherein at least one of the teeth between said first means and said transducer means is always in engagement with the leading edge of its respective perforation for advancing said medium.

7. An apparatus for advancing a film strip having spaced perforations adjacent one longitudinal edge and a sound reproducing track adjacent the other edge, comprising in combination:
   a continuously rotatable member about at least a portion of which said film strip is wrapped for driving engagement therewith, said member having a plurality of circumferentially spaced teeth extending from one of a pair of spaced peripheral surfaces for entering respective perforations in said film strip, said pair of peripheral surfaces being substantially equal in diameter and smaller in diameter than the root diameter of said teeth;
   a canted roller arranged adjacent said rotatable member for urging and holding said film strip in engagement with said pair of peripheral surfaces as said film strip is moved therepast;
   a snubbing member arranged generally opposite said canted roller and adjacent said rotatable member for engaging and guiding said film strip into an outgoing path; and a sound transducer head arranged intermediate said canted roller and said snubbing member and in sound-transducing engagement with said sound track; said head holding said film strip against the other of said pair of peripheral surfaces and exerting a force on said film strip opposing the movement thereof such that said film strip assumes a position in which said film strip is free of said pair of peripheral surfaces, at least between said canted roller and said head, so that only the teeth between said canted roller and said head engage the leading edges of their respective perforations for advancing said film strip.

8. An apparatus in accordance with claim 7 wherein said film strip is wrapped around at least 135° of said rotatable member.

9. An apparatus in accordance with claim 7 wherein said film strip is moved between said canted roller and said sound transducer head in an arcuate plane corresponding substantially to that of the root diameter of said teeth.

10. A method of advancing a film strip having a sound reproducing track adjacent one edge thereof past a sound transducer head, the method comprising:
   pushing the film strip toward the head along an arcuate path; and
   biasing the sound transducer head against the film strip and into sound transducing relationship with the sound track on the film strip, the biasing force being sufficiently great to oppose movement of the strip past the transducer head, thereby bowing the film strip away from its normal arcuate path of travel as the film strip approaches the transducer head.

11. An apparatus for advancing an elongate web having spaced perforations adjacent one longitudinal edge and a sound reproducing track adjacent the other edge, comprising in combination:
   movable means about which said web is adapted to be at least partially wrapped for driving engagement therewith, said means having a pair of spaced arcuate surfaces and a plurality of spaced teeth projected above one of said surfaces for entering the perforations in said web;
   said pair of peripheral surfaces being substantially equal in diameter and smaller in diameter than the root diameter of said teeth;
   means for urging and holding said web in driving engagement with said pair of surfaces as said web is moved therepast;
   transducer means spaced from said urging and holding means;
   means urging said transducer means into sound transducing relationship with said sound track, the force of said transducer urging means acting through said transducer means for holding said web against the other of said pair of surfaces and for exerting a force on said web opposing movement of the web between the transducer means and said other surface so that said web is bowed and free of said pair of arcuate surfaces between said urging and holding means and said transducer means.

12. A method of advancing a film strip having a sound reproducing track arranged adjacent one edge thereof past a sound transducer head which comprises:
   positioning said film strip in sound transducing relationship to said head;
   applying a force to said film strip in the immediate vicinity of said head that opposes movement of said film strip;
   pushing said film strip continuously toward said head in opposition to said force so that the portion of said film strip between said head and the point at which said film is pushed is bowed from its normal path.

13. A method of advancing a film strip having a sound reducing track arranged adjacent one edge thereof past a sound transducer head which comprises:
   positioning said film strip in sound transducing relationship to said head;
   applying a force to said film strip in the immediate vicinity of said head that opposes movement of said film strip;
   pushing said film strip continuously toward said head in opposition to said force so that this portion of said film strip between said head and the point at which said film strip is pushed is bowed from its normal path; and
   snubbing that portion of said film strip moved past said head.

References Cited

UNITED STATES PATENTS

| | | | |
|---|---|---|---|
| 2,646,989 | 7/1953 | Davis | 226—84 X |
| 3,310,636 | 3/1967 | D'Arcy | 226—82 X |
| 3,310,790 | 3/1967 | Nakamichi | 226—82 X |

ALLEN N. KNOWLES, *Primary Examiner.*

UNITED STATES PATENT OFFICE
CERTIFICATE OF CORRECTION

Patent No. 3,387,755  June 11, 1968

William A. Martin

It is certified that error appears in the above identified patent and that said Letters Patent are hereby corrected as shown below:

Column 6, line 53, "medium" should read -- web --.

Signed and sealed this 25th day of November 1969.

(SEAL)
Attest:

Edward M. Fletcher, Jr.
Attesting Officer

WILLIAM E. SCHUYLER, JR.
Commissioner of Patents